United States Patent
Gilliland et al.

(10) Patent No.: US 7,091,635 B1
(45) Date of Patent: Aug. 15, 2006

(54) MOTOR/FLYWHEEL ASSEMBLY WITH SHROUDED RADIAL COOLING FAN

(75) Inventors: Michael L Gilliland, Kent, OH (US); David B Finkenbinder, Ravenna, OH (US); Michael Coles, Kent, OH (US)

(73) Assignee: Ametek, Inc., Kent, OH (US)

( * ) Notice: Subject to any disclaimer, the term of this patent is extended or adjusted under 35 U.S.C. 154(b) by 0 days.

(21) Appl. No.: 10/970,802

(22) Filed: Oct. 20, 2004

(51) Int. Cl.
*H02K 9/06* (2006.01)
*H02K 5/20* (2006.01)

(52) U.S. Cl. .............................. 310/62; 310/63; 74/572; 482/54

(58) Field of Classification Search .................... 310/52, 310/58–63, 74, 153; 74/572, 574, 93; 482/54
See application file for complete search history.

(56) References Cited

U.S. PATENT DOCUMENTS

| | | | |
|---|---|---|---|
| 3,750,781 A * | 8/1973 | Lengsfeld | 192/18 B |
| 4,817,454 A * | 4/1989 | Schopf et al. | 74/572.21 |
| 5,159,916 A * | 11/1992 | Isogawa | 123/406.56 |
| 5,476,430 A * | 12/1995 | Lee et al. | 482/54 |
| 5,714,819 A * | 2/1998 | Gilliland et al. | 310/91 |
| 5,735,669 A * | 4/1998 | Niemela | 416/60 |
| 6,439,843 B1 * | 8/2002 | Finkenbinder | 415/172.1 |
| 6,695,581 B1 | 2/2004 | Wasson et al. | 416/60 |
| 2006/0063648 A1 * | 3/2006 | Ko | 482/54 |

FOREIGN PATENT DOCUMENTS

JP 59112402 A * 6/1984

* cited by examiner

*Primary Examiner*—Darren Schuberg
*Assistant Examiner*—David W. Scheuermann
(74) *Attorney, Agent, or Firm*—Renner Kenner Greive Bobak Taylor & Weber

(57) ABSTRACT

A flywheel/motor assembly is disclosed that comprises a motor housing having a sidewall and an end wall extending substantially perpendicularly from the sidewall. The end wall enclose a motor assembly having a rotatable shaft extending therefrom. The motor housing has at least one air flow opening therethrough. A flywheel is coupled to the shaft, and includes a pulley side and a motor side opposite the pulley side, wherein the motor side is aligned substantially with the end wall and does not extend over the sidewall. A plurality of vanes are associated with the flywheel, wherein adjacent vanes form channels therebetween. A ring is coupled to the plurality of vanes and at least partially encloses the channels and forms exhaust ports away from the shaft. Rotation of the flywheel draws air through the motor housing's openings into the channels and out the exhaust ports. The pulley side may include balancing bores for receiving balancing material to balance the finished assembly. An angular interference fit between the flywheel and motor shaft may also assist in balancing the finished assembly. A ventilation fan system may also be connected to the shaft at an end opposite the flywheel.

36 Claims, 16 Drawing Sheets

MOTOR/FLYWHEEL ASSEMBLY WITH SHROUDED RADIAL COOLING FAN

TECHNICAL FIELD

The present invention is generally directed toward motor assemblies with an attached flywheel. Specifically, the present invention is directed to a flywheel assembly with a radial fan that improves cooling air flow and thus enhances the overall performance of the motor. In particular, the present invention is directed to a flywheel assembly with a shrouded radial fan having a sealed inlet that improves air flow through the motor housing which may also include a ventilation fan system at an end opposite the flywheel assembly.

BACKGROUND OF THE INVENTION

Flywheels are used with various types of motor-driven equipment. Their primary purpose is to provide an opposing and moderating force by its inertia to any fluctuation of speed in the machinery which it revolves. Some flywheels have integral vanes or blades to produce air flow through the motor assembly that rotates the flywheel. But if the integral vanes are improperly configured they may generate excessive noise. Indeed, motor applications may utilize a flywheel that has an open-vane design which allows the air to roll off the vane axially as the flywheel rotates causing turbulence and resulting in excessive noise. Most of the air that starts at the inner diameter of the vanes never makes it to the exhaust tip of the blades and as such, this type of design is considered to be very inefficient. Moreover, since there is no ring closing the front area of the fan, there is no capacity or ability to incorporate an eye seal.

One attempt at improving a flywheel assembly is disclosed in U.S. Pat. No. 6,695,581. This patent discloses a fan-flywheel-pulley assembly used in conjunction with an electric motor. The pulley extends axially from the flywheel and drives a belt as is commonly used on treadmill exercise equipment. The flywheel includes an outer circumferential flywheel surface partially forming a plurality of circumferentially spaced openings. The flywheel may include a baffle that extends circumferentially and in close proximity to a cylindrical wall unit of the motor from an inner diameter to an outer diameter to limit a gap between the baffle and the cylindrical wall unit. This assembly may also include a radial fan disposed within the flywheel including a plurality of blades extending at least from the flywheel inner diameter to the outer diameter, wherein each opening is positioned between each adjacent fan blade. This patent also discloses that the pulley, the flywheel, and the radial fan may be integrally formed.

Although this disclosed configuration is an improvement in the art, it is believed that configuring the flywheel to surround the motor housing with the radial fan disposed away from the motor housing still allows for air flow inefficiencies. It is believed that this is a result of the cooling air having to travel a further distance through the flywheel assembly. Moreover, the gap between the baffle and the motor housing allows for "parasitic" airflow which generates noise and reduces fan efficiency. In addition, the gap between the baffle and the motor housing allows for internal fan noise to be emitted therefrom.

Yet a further drawback of the known flywheel motor assemblies is attributed to the imbalance problems in coupling the flywheel to the motor's rotatable shaft. When the flywheel is in an imbalance condition, undue stress is placed on the motor during operation and after a period of time, causes excessive wear on the motor and generates vibration. This generates additional noise and, of course, adversely effects the operation of the associated machinery. Indeed, it is believed that the shaft configuration of known assemblies does not sufficiently control flywheel positioning after assembly. In most assemblies, the flywheel is contained axially by seating against a small annular ring on the shaft face. This configuration is believed to be insufficient for controlling and maintaining radial alignment. In order to overcome this system imbalance after assembly, the flywheel motor assembly must undergo a final balancing operation. As will be appreciated, this is a time-consuming operation and does not always ensure that a balanced condition is obtained.

Therefore, there is a need in the art for a more efficient flywheel/fan assembly that improves air flow through a motor housing, reduces noise and also provides improved balance quality.

SUMMARY OF THE INVENTION

It is therefore a first object of the present invention to provide a motor/flywheel assembly with shrouded radial cooling fan.

It is yet another aspect of the present invention to provide a flywheel motor assembly, comprising a motor housing having a sidewall and an end wall extending substantially perpendicularly from the sidewall, the end wall having a rotatable shaft extending therefrom, and the motor housing having at least one airflow opening therethrough, a flywheel coupled to the shaft, the flywheel comprising a pulley side and a motor side opposite the pulley side, wherein the motor side is aligned substantially with the end wall and does not extend over the sidewall, a plurality of vanes associated with the flywheel, wherein adjacent vanes form channels therebetween, and a ring coupled to the plurality of vanes, the ring at least partially enclosing said channels and forming exhaust ports away from the shaft, wherein rotation of the flywheel draws air through the motor housing into the channels and out the exhaust ports.

It is still another aspect of the present invention to provide a flywheel motor assembly comprising a motor housing having a sidewall and opposed ends with flow through openings at least through the ends, the motor having a rotatable shaft extending from the ends, a flywheel coupled to one end of the shaft, and a ventilation system coupled to an opposite end of the shaft, wherein the ventilation system generates an air flow through the flow through openings toward said the flywheel.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

Figure 1:
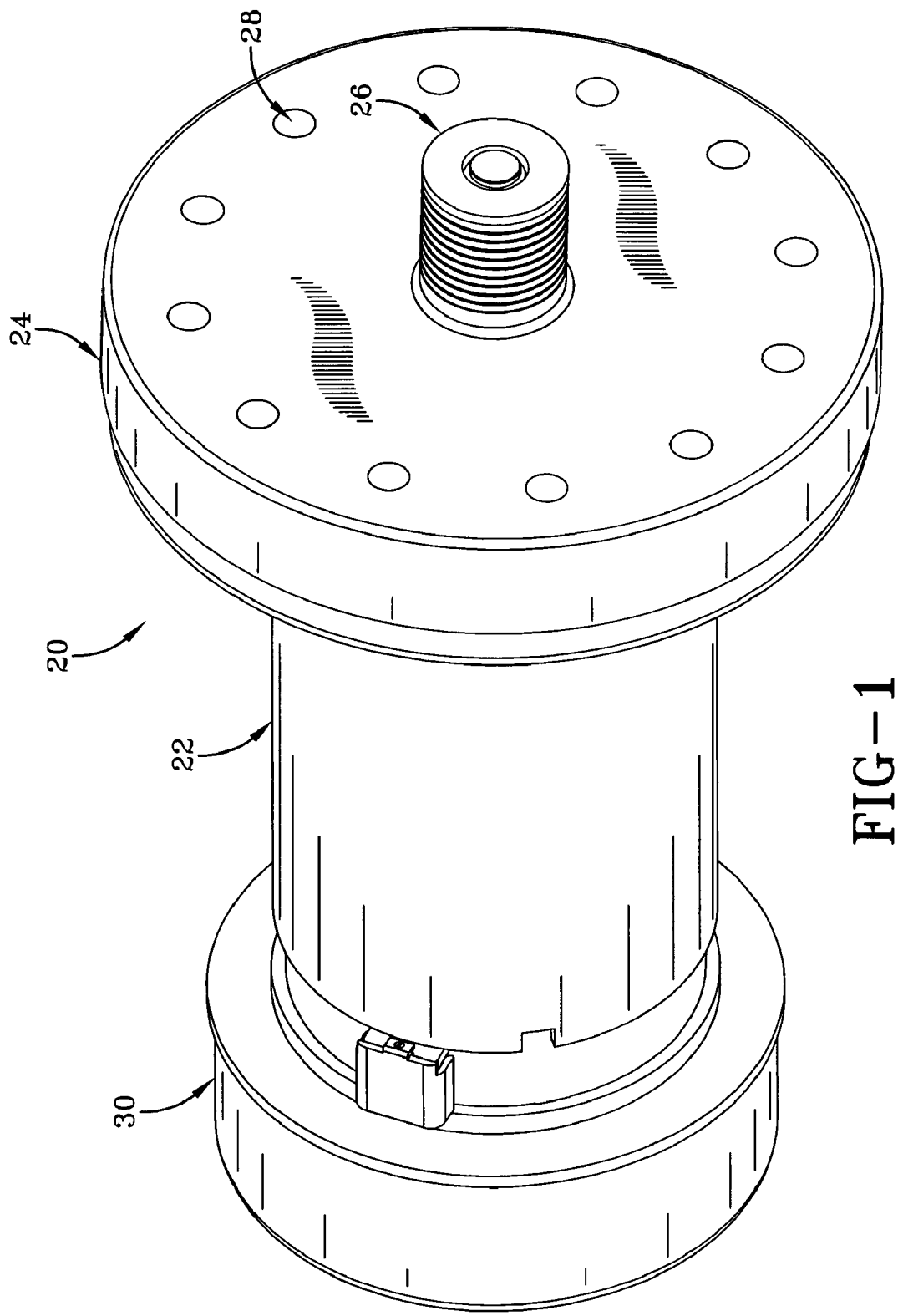
FIG. 1 is a perspective view of a flywheel/motor assembly made in accordance with the concepts of the present invention.

Referring now to the drawings, and in particular to FIG. 1, it can be seen that a flywheel/motor assembly is designated generally by the numeral 20. The assembly 20 includes a motor housing 22 which receives a motor, the internal components of which are not shown. As will be appreciated by those skilled in the art, the motor assembly includes a rotor and a stator. When the motor is energized, the rotor rotates a shaft. A flywheel assembly, designated generally by the numeral 24, is connected to and rotated by the shaft. Axially extending from the flywheel assembly is a pulley 26 which is received by a movable belt or other mechanism for movement thereof. The pulley 26 may be grooved, as shown in the drawing, or it may be smooth depending upon the particular end application. Radially disposed about the flywheel 24 is a plurality of equadistantly spaced balancing bores 28. The purpose of the bores 28 will be discussed in detail as the description proceeds. Coupled to an end of the motor housing 22, opposite the pulley 26, is a ventilation system 30. The ventilation system may be used to assist in pulling cooling air into the motor housing while precluding entry of debris or other matter that would otherwise interfere with operation of the motor. In the alternative, a simple vent cover could be used, but it is believed that the ventilation fan system increases air flow through the housing and thus improves overall performance of the assembly. Details of the ventilation fan system will be discussed after a review of the various flywheel embodiments.

Figure 2:
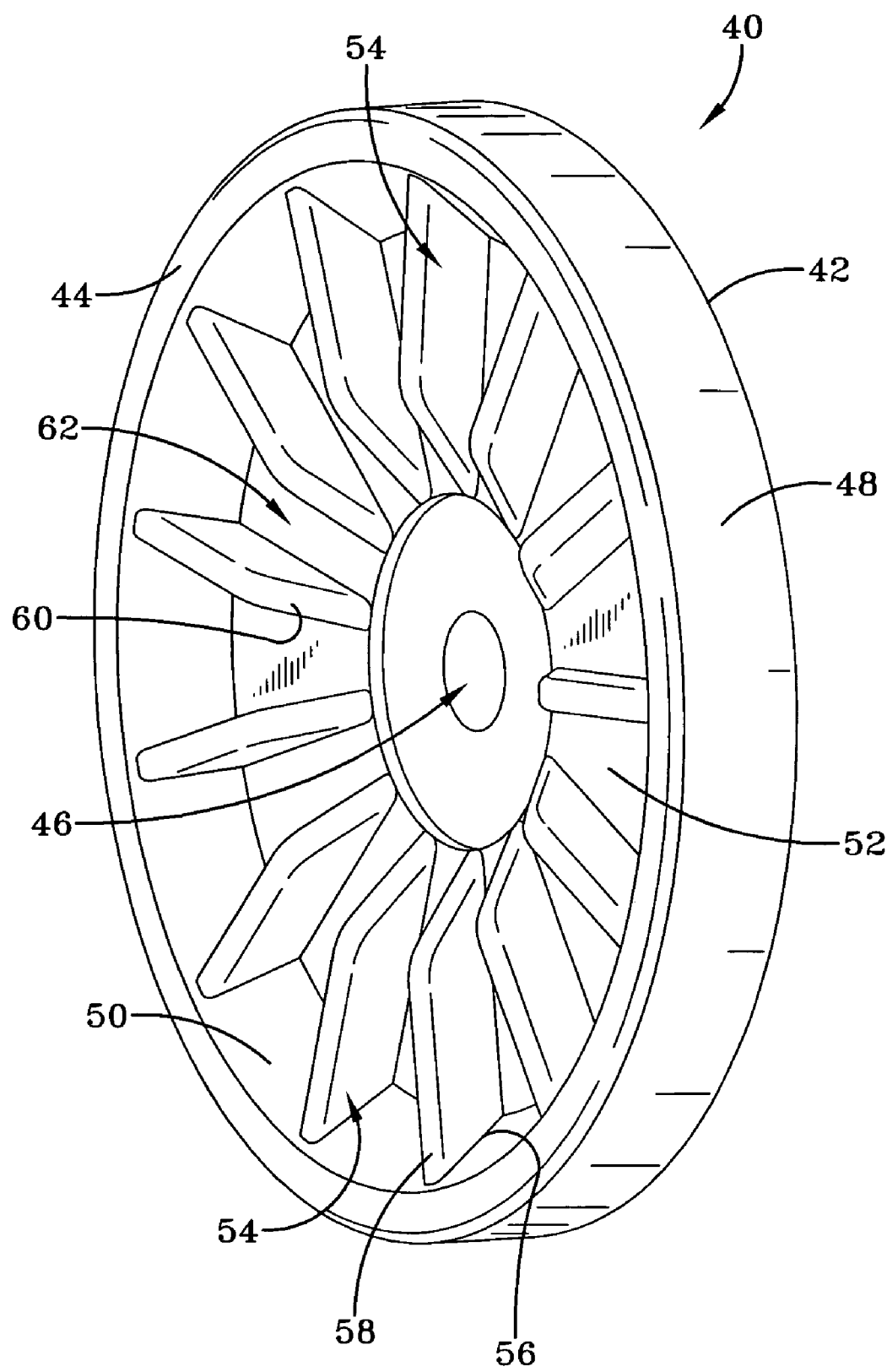
FIG. 2 is a perspective view of a flywheel made in accordance with a first embodiment of the present invention.
Figure 3:
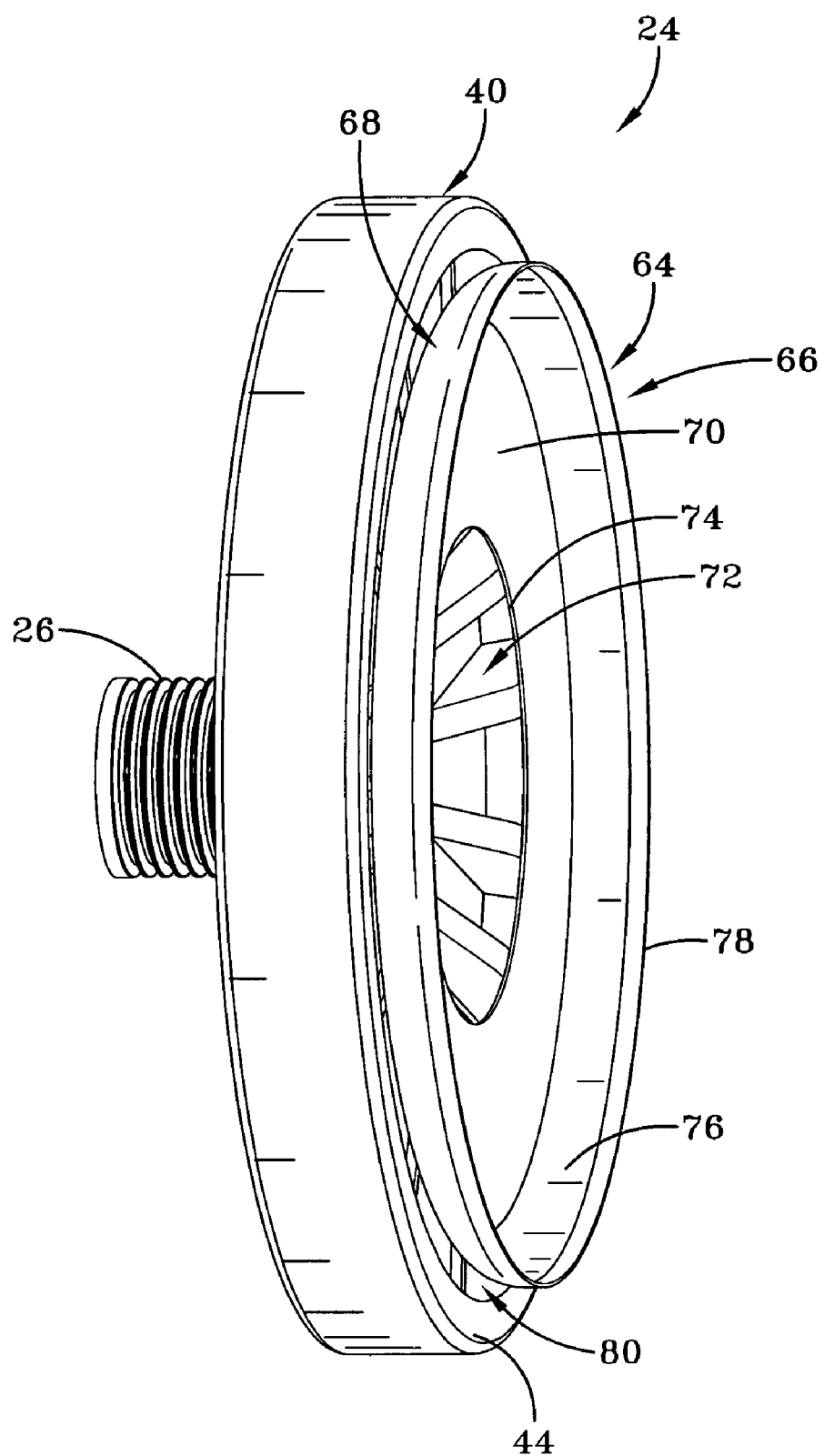
FIG. 3 is a perspective view of a shrouded flywheel made in accordance with the first embodiment.
Figure 4:
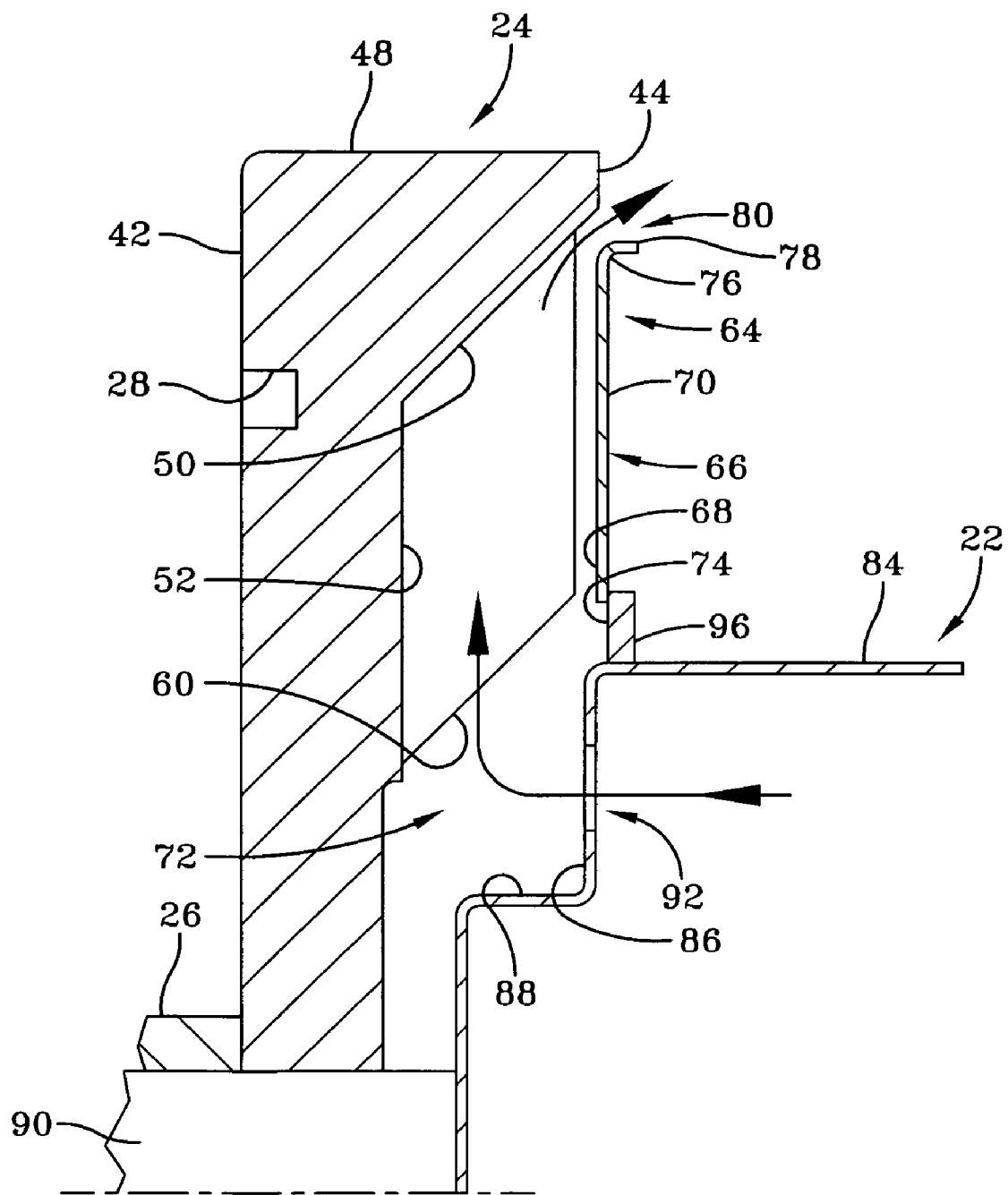
FIG. 4 is a partial cross-sectional view of the flywheel/motor assembly made in accordance with the first embodiment.
Figure 5:
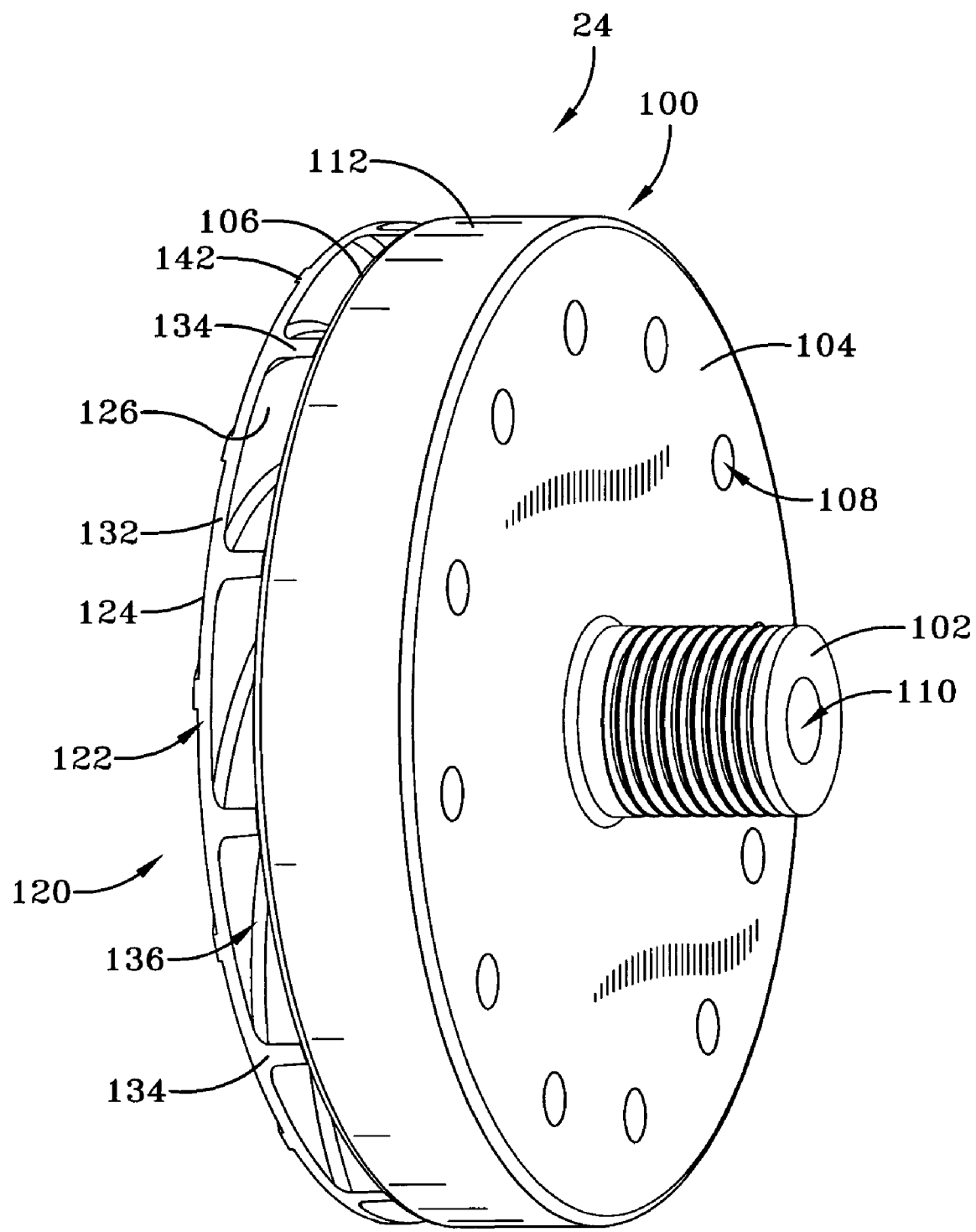
FIG. 5 is a perspective view of a fan/flywheel assembly made in accordance with a second embodiment of the present invention.
Figure 6:
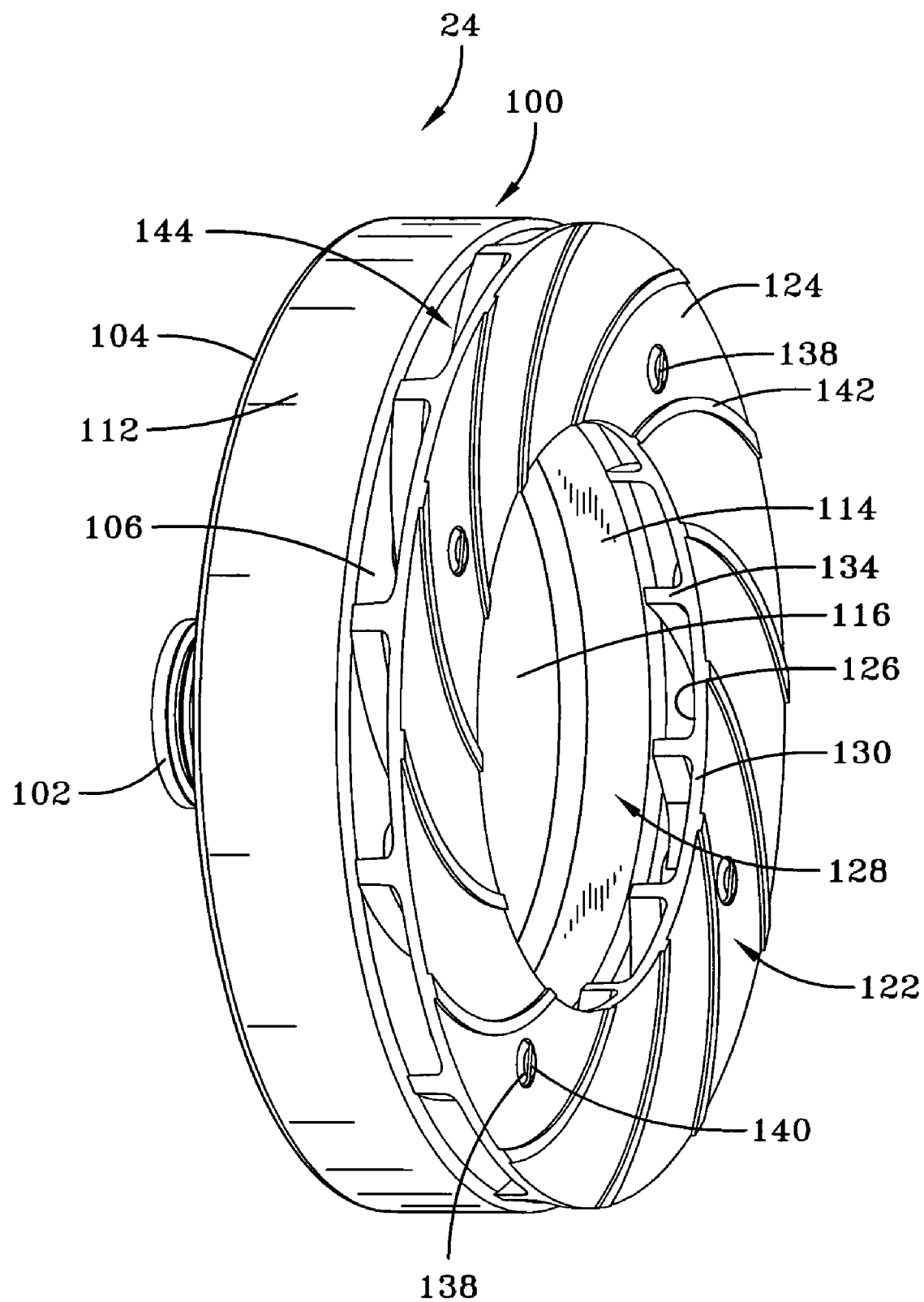
FIG. 6 is an opposing perspective view of the fan/flywheel assembly illustrating details of a fan assembly made in accordance with the second embodiment.
Figure 7:
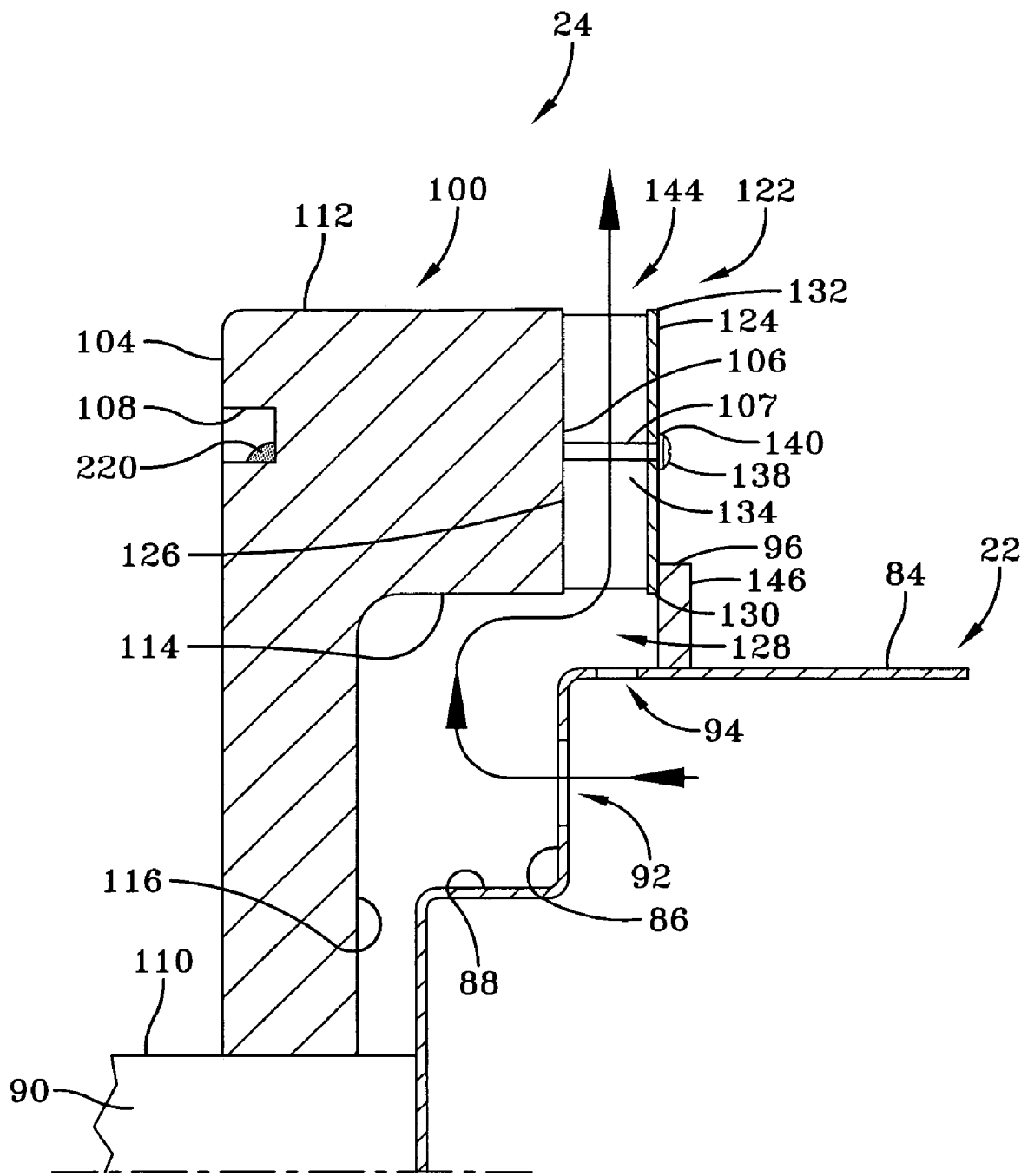
FIG. 7 is a partial cross-sectional view of the flywheel/motor assembly made in accordance with the second embodiment.
Figure 8:
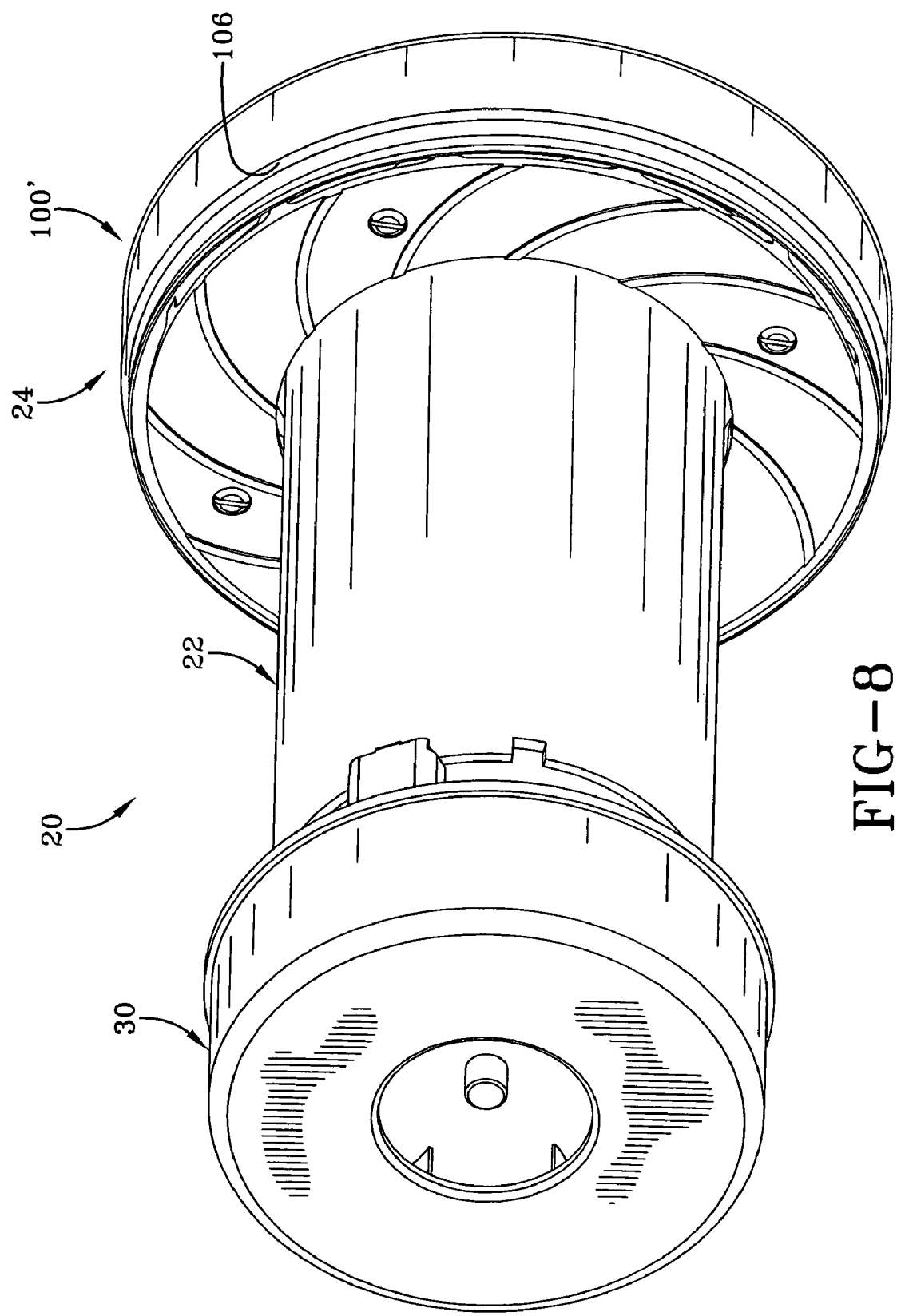
FIG. 8 is a perspective view of a flywheel/motor assembly made in accordance with a third embodiment of the present invention.
Figure 12:
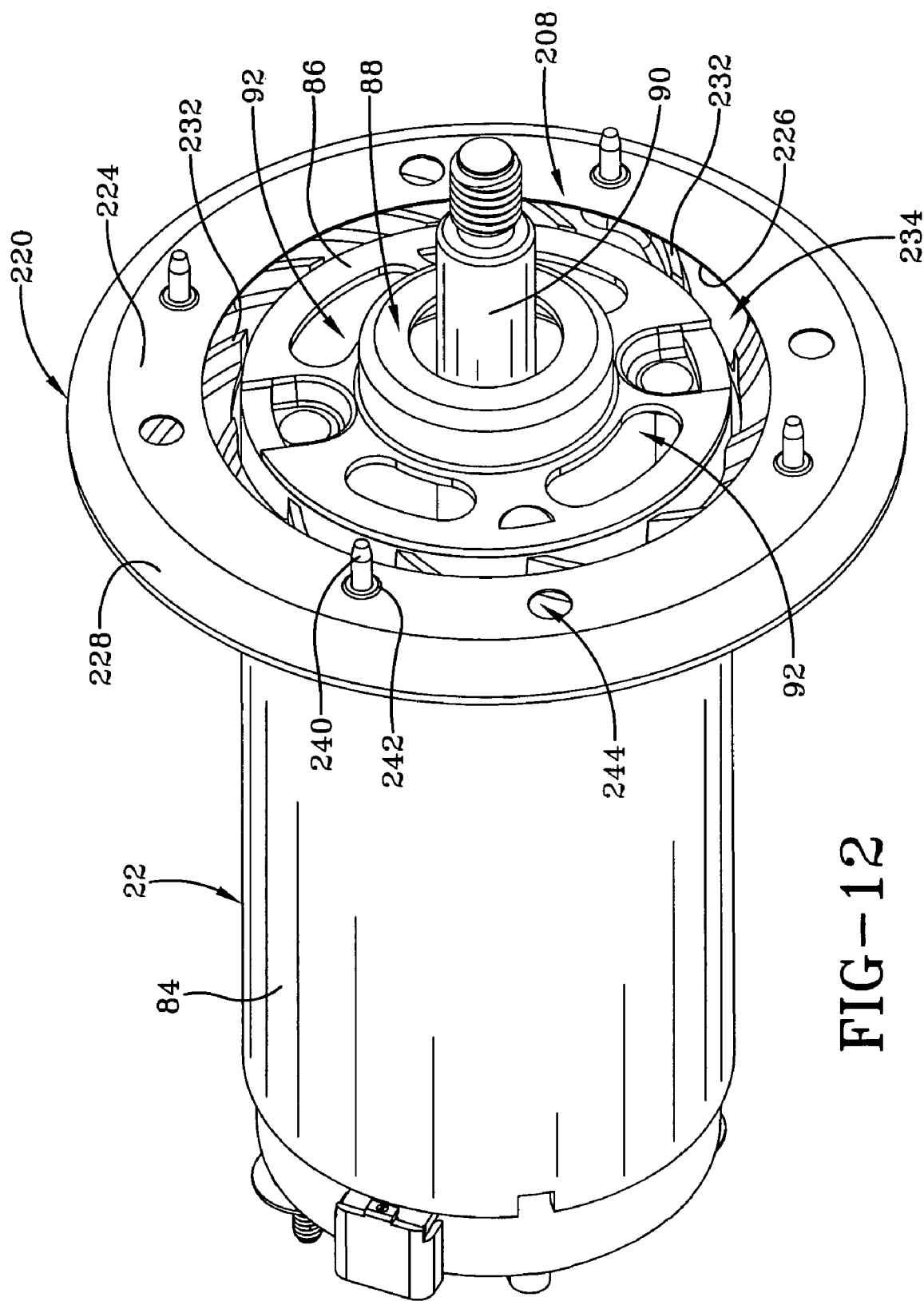
FIG. 12 is a partial perspective view of a flywheel/motor assembly, without showing the flywheel, made in accordance with a fourth embodiment of the present invention.
Figure 13:
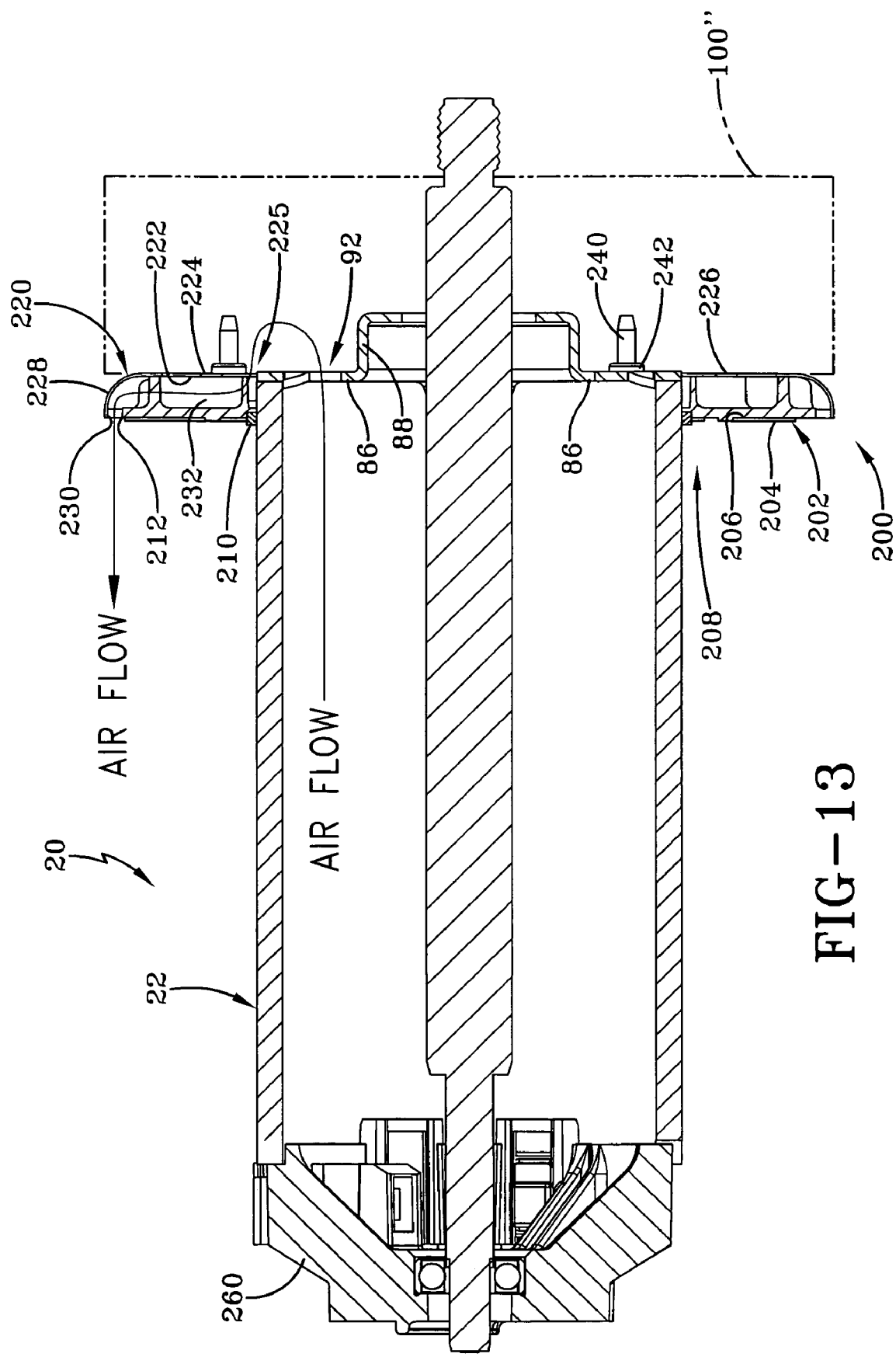
FIG. 13 is a partial cross-sectional view of the flywheel/motor assembly made in accordance with the fourth embodiment.

The flywheel/motor assembly 20, as described herein, includes four different flywheel assembly embodiments with an improved fan configuration. The first embodiment is shown in FIGS. 2–4; the second embodiment is shown in FIGS. 5–7; the third embodiment is shown in FIGS. 8–11; and the fourth embodiment is shown in FIGS. 12–13. All four embodiments may incorporate a unique shaft taper configuration shown in FIGS. 14–16 that allows for improved securement of the flywheel assembly to the motor shaft. This aides in the balancing of the flywheel/motor assembly along with the balancing bores 28. And FIG. 17 shows the details of the fan ventilation system 30 that may be used independently with a motor assembly or together with any of the four flywheel assembly embodiments.

Referring now to FIGS. 2–4, it can be seen that a flywheel used in the first embodiment is designated generally by the numeral 40. The flywheel 40 includes a pulley side 42 opposite a motor side 44. Extending through the flywheel 40 is a shaft aperture 46. A rim 48 connects the pulley side 42 to the motor side 44, and an inner rim wall 50 extends from the motor side to a plate 52. As is common with most all flywheels, the rim 48 provides a substantial mass to ensure the smooth and continuous operation of the equipment associated with the pulley. It will further be appreciated that the inner rim wall 50 may be angled from the motor side 44 to the plate 52 although it may be perpendicularly configured.

The flywheel 40 includes a plurality of blades 54 which extend from the plate 52 and are radially configured from the inner rim wall 50 toward the shaft aperture 46. Each blade 54 includes a wall end 56 that is integral with the inner rim wall 50. A wall edge 58 extends along an exposed edge of the blade from the wall end 56 and terminates at an aperture end 60 that is angularly configured to taper toward the shaft aperture 46. Preferably, the blades terminate prior to reaching the vicinity of the shaft aperture. The aperture ends 60 are shown as being angled but they could be provided in a perpendicular configuration. Each of the blades 54 define a channel 62 therebetween. It will further be appreciated that the wall edge 58 of each blade 54 does not extend above the inner rim wall 50. Indeed, the height of the wall edges 58 are preferably somewhat recessed with respect to the motor side 44.

A shroud, which is designated generally by the numeral 64 and best seen in FIGS. 3 and 4, is carried by the motor side 44 of the flywheel 40. The shroud 64 includes a ring 66 which has a pulley side 68 positioned adjacent and preferably contacting the wall edges 58, and a motor side 70 which is ultimately positioned adjacent the motor housing 22. Extending through the ring 66 is an eyelet 72 which provides an inner diameter 74 that is preferably aligned with the aperture ends 60 of the blades 54. The ring 66 also provides a peripheral lip 76 that is curved from the pulley side 68 toward the motor side 70. The lip 76 provides an outer diameter 78 that is somewhat less than the flywheel's inner wall diameter. Accordingly, with the shroud 64 secured to the flywheel 40, either by the use of fasteners, welding, adhesive or other well known attachment means, a plurality of exhaust ports 80 are formed. In other words, the pulley side 68 is positioned adjacent the blades 54 and may be in contact therewith so that the channels 62 are at least partially enclosed with the ports 80. And the peripheral lip 76 is oriented in a direction toward the motor housing.

As best seen in FIG. 4, it will be appreciated that the motor housing 22 includes a side wall 84 which terminates at an end wall 86. Axially extending from the end wall 86 is a bearing bracket 88 which receives an internal bearing (not shown) that facilitates the rotation of a shaft 90 that extends axially therefrom. As noted previously, the shaft 90 is part of the motor assembly carried by the housing and the shaft rotates as determined by the characteristics of the motor assembly. The end wall 86 provides a motor end wall opening 92 therethrough. The flywheel 40 is secured to the shaft 90 in a conventional manner or in a manner described in this disclosure. In any event, the shroud 64 is assembled to the flywheel 40 so as to provide a flywheel assembly configuration 24 wherein cooling air flow through the motor housing and assembly can now be described.

As the motor shaft 90 rotates, the flywheel assembly 24 likewise rotates. The blades 54 pull air through the motor housing and the end wall openings 92 and then the air flow is directed through the channels 62. This air flow is then deflected by the inner rim wall 50 and exhausted out the exhaust ports 80. The curved lip 76 provides a smooth transitional path for the air flow which assists in reducing ambient noise levels.

In order to enhance the air flow through the channels 62, it will be appreciated that a seal 96 may be disposed between the sidewall 84 or the end wall 86, and the ring 66. The seal 96 is preferably made of an expanded polytetrafluoroethelene material which has been found to have superb heat resistance properties and also wears exceptionally well. The seal 96 may be attached to either the motor housing 22 or the flywheel assembly 24 and bear against the other of the two surfaces. Moreover, the seal may be attached to one of the two surfaces by the use of adhesive, fasteners; or the seal may be crimped or clamped to the housing or the shroud. Use of the seal 96 prevents parasitic air flow from being drawn in through the gap formed between the flywheel and the motor housing by the blades as they rotate and which would interfere with the cooling airflow.

Referring now to FIGS. 5–7, it can be seen that a second embodiment of the fan/flywheel assembly 24 includes a flywheel designated generally by the numeral 100. The flywheel 100 is configured similarly to the flywheel 24 but provides some structural differences. In particular, the flywheel 100 includes an axially extending pulley 102 that extends from a pulley side 104. Opposite the pulley side 104 is a motor side 106. The motor side has a plurality of fastener bores 107. Radially disposed and equadistantly spaced about the pulley side 104 are a plurality of balancing bores 108. Extending through the flywheel 100 and the pulley 102 is a shaft aperture 110. Connecting the pulley side 104 to the motor side 106 is a rim 112. An inner rim wall 114 extends from the motor side 106 to a plate 116. The plate 116 is substantially perpendicular to the inner rim wall 114 and extends all the way to the shaft aperture 110.

The fan assembly, which is designated generally by the numeral 120, is preferably attached to the motor side 106. The fan assembly includes a ring 122 that has a motor side 124 opposite a rim side 126. Extending through ring 122 is an eyelet 128 which provides an inner diameter 130 which is substantially equivalent to the inner rim wall's inner diameter. The ring 122 includes an outer edge 132 which has a diameter substantially equivalent to the outer diameter of the rim 112.

A plurality of curvilinear vanes 134 extend from the inner diameter 130 to the outer edge 132. Adjacent vanes 134 form a channel 136 therebetween wherein orientation of the ring 122 with respect to the inner rim wall 114 causes the vanes to be positioned adjacent or in close proximity to the motor side 106. At least one of the vanes 134, and preferably more, may be provided with a fastener aperture 138 therethrough at about a mid-point between the inner diameter and the outer edge. The fan assembly 120 is positioned such that fasteners 140 are received in respective apertures 138 bores 107 to secure the ring 122 to the motor side 106. If desired, a plurality of decorative ridges 142 may be placed on the motor side 106. In the alternative, the ridges may be in the form of grooves. In any event, when the ring 122 is assembled to the motor side 106, a plurality of exhaust ports 144 are provided about the radial edge of the fan/flywheel assembly 24.

As best seen in FIG. 7, the flywheel 100 is secured to the shaft 90 such that the air flow properties are similar to that of the first embodiment. This configuration is slightly different inasmuch as the motor housing may be provided with a motor side wall opening 94 that is positioned to be in a proximal relationship with the channels 136. As the flywheel 100 is rotated, air is drawn in through the motor housing and exhausted through the openings 92 and 94. This air is then collected by the vanes 134 and expelled through the channels 136 and out the exhaust ports 144. In this particular embodiment, the cooling air is exhausted radially. As in the previous embodiment, a seal 146 may be provided between the flywheel 100 and the motor housing 22. Attachment of the seal 146 may be in the manner described in the first embodiment.

Figure 9:
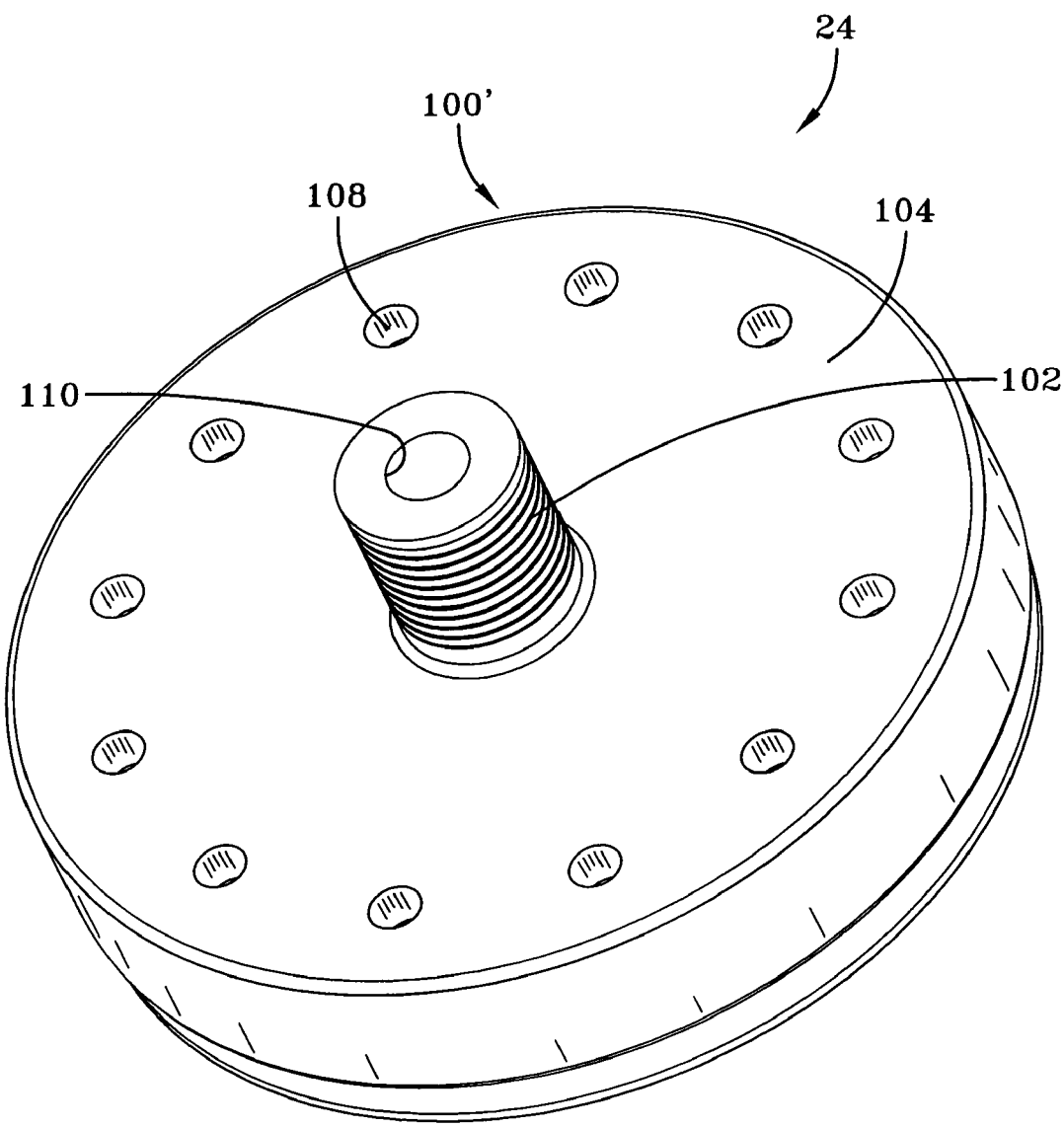
FIG. 9 is a perspective view of a fan/flywheel assembly made in accordance with the third embodiment.
Figure 10:
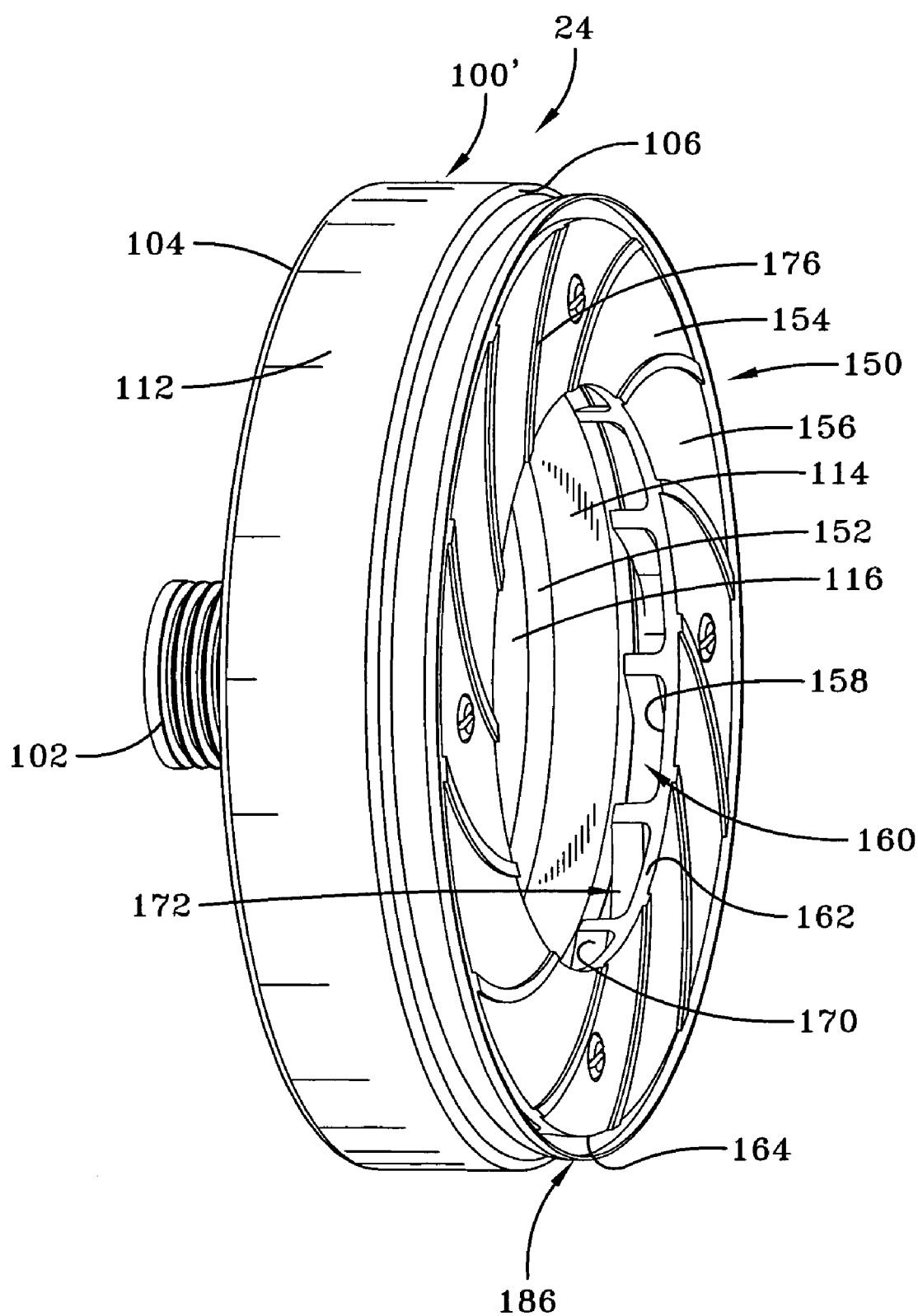
FIG. 10 is a perspective view illustrating the details of the fan/flywheel assembly made in accordance with the third embodiment.
Figure 11:
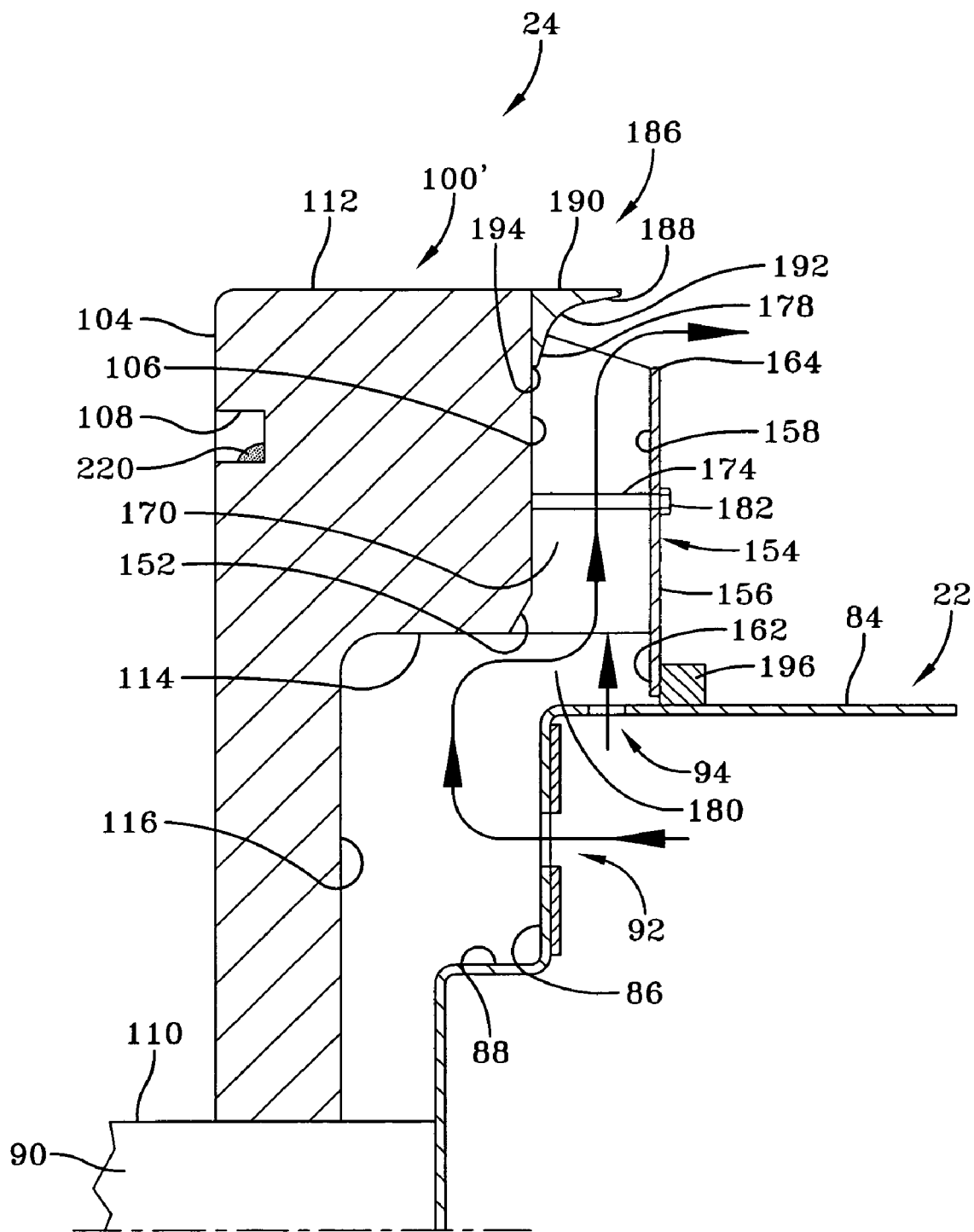
FIG. 11 is a partial cross-sectional view of the flywheel/motor assembly made in accordance with the third embodiment.

Referring now to FIGS. 8–11, it can be seen that the flywheel/motor assembly is designated generally by the numeral 20 in much the same manner as the previous two embodiments discussed. This embodiment includes the motor housing 22 and a flywheel 100' which provides a shrouded radial fan assembly designated generally by the numeral 150. Opposite the flywheel 100' and secured to the motor housing 22 is the ventilation system 30. In FIGS. 9 and 10 it can be seen that the flywheel 100' includes the motor side 106 opposite the pulley side 104 wherein the pulley 102 extends axially from the pulley side 104. The motor side 106 includes at least one fastener bore 106. As in the previous embodiments, a plurality of balancing bores 108 may be provided on the pulley side 104. Extending through the flywheel 100' is a shaft aperture 110 and as in the previous embodiments the flywheel 100' includes a rim 112, an inner wall 114, and a plate 116. The flywheel in this embodiment is distinguishable in that a rim chamfer 152 may be provided between the motor side 106 and the inner rim wall 114.

The fan assembly 150, although similar to the fan assembly described in the second embodiment, provides unique structural features not previously described. The fan assembly 150 includes a ring 154 which has a motor side 156 opposite a rim side 158. Extending through the ring 154 is an eyelet 160 that forms an inner diameter 162. Connecting the motor side 156 and the rim side 158 is an outer edge 164. It will be appreciated that the inner diameter 162 is slightly larger than the outer diameter or periphery of the motor housing and that the outer edge 164 is, in this particular embodiment, somewhat less in diameter than the outer diameter of the rim 112.

Extending from the rim side 158 are a plurality of curvilinear vanes 170, wherein adjacent vanes form a channel 172 therebetween. Extending through some of the vanes 170 may be a fastener aperture 174 that is alignable with a respective fastener bore 107. Extending from the motor side 156 may be a plurality of decorative ridges 176. Preferably, each of the vanes 170 has a shroud notch 178 that is provided at the outermost peripheral edge and is provided on the edge of the vane adjacent the motor side 106 of the flywheel. Opposite the end of the vane 170 providing the shroud notch 178 is a vane wing 180 that conforms to the shape of the rim chamfer 152 and preferably makes contact therewith. As best seen in FIG. 11, a fastener 182 is received in each of the fastener apertures 174 and bores 107 for the purpose of securing the fan assembly 150 to the flywheel 100'. Of course, other attachment mechanisms could be used.

A shroud 186 is captured between the fan assembly 150 and the flywheel 100'. It will be appreciated that the shroud 186 may be positioned on the motor side prior to assembly of the fan assembly 150 to the flywheel. The shroud 186 includes a flywheel face 188. And extending substantially perpendicular from the flywheel face 188 is a radial face 190. Connecting the two faces 188 and 190 is a deflection face 192. The deflection face 192 is preferably curved in shape and faces the exterior ends of the curvilinear vanes 170 when assembled. A tab end 194 connects the deflection face 192 to the flywheel face 188 and is captured and secured by the shroud notch 178 when assembled to the flywheel 100'. In the alternative, the ring 154 may be assembled to the flywheel 100' and then the shroud, when made from a flexible material, is moved into position and held by the vanes 170 against the motor side 156.

As in the first two embodiments, a seal 196 may be disposed between the ring 154 and the motor housing 184. As discussed in the previous embodiments, the seal could be secured to one of the other surfaces so as to preclude entry of parasitic air between the gap formed between the inner diameter 162 and the motor housing 84.

This particular embodiment is distinguishable from the other two in that the shroud 186 is located at the furthest radial position of the flywheel. In particular, the air flow is drawn through the motor housing 22 and may exit either of the openings 92 or 94. The air flow is enhanced by the provision of the ring wing 180 and by the rim chamfer 152. The air is then directed through the channels 172 and is radially directed therefrom. The air then strikes the curved deflection face 192 and then is expelled axially along the motor housing wall 84. It is believed that this particular embodiment is the most efficient for moving air through the motor housing in view of the openings 92 and 94; the positional relationship of the vanes with respect of the openings inasmuch as the inner wall 114 does not surround the motor housing; and the direction of the air flow against the deflection face into an axial direction. Moreover, by smoothly moving the air through the chamfered surfaces 152 and the deflection face 192, it is believed that the generation of noise is significantly reduced.

Referring now to FIGS. 12–13, it can be seen that the flywheel/motor assembly is designated generally by the numeral 20. This embodiment includes the motor housing 22 and a flywheel 100" which provides a shrouded radial fan assembly designated generally by the numeral 200. Opposite the flywheel 100" and secured to the motor housing 22 is the ventilation system 30. The flywheel 100" is essentially the same as the one shown in FIGS. 9–10. And the shrouded radial fan assembly 200 is also similar to the radial fan assembly shown in FIGS. 9–10 but with some structural differences. As in the previous embodiment, the radial fan assembly 200 is attached to, but is not integral with, the flywheel assembly.

The fan assembly 200 includes a ring 202 which has a motor side 204 opposite a rim side 206. The ring 202 has an eyelet 208 extending therethrough which provides an inner diameter 210. The inner diameter is sized to be slightly larger than the outer diameter of the motor housing 22. The ring 202 also provides an outer edge 212 which connects the motor side 204 to the rim side 206.

The radial fan assembly 200 also includes a shroud plate 220 which has a ring side 222 opposite a flywheel side 224. Extending through the shroud plate 220 is a shroud plate opening 225 which forms an inlet edge 226. The outer periphery of the shroud plate 220 is defined by a shroud 228 which forms a deflection face 230 on the ring side 222. In other words, the deflection face 230 faces the ring 202 and the motor housing 22.

Disposed between and connecting the ring 202 to the shroud plate 220 are a plurality of curvilinear vanes 232. Adjacent vanes 232 form a channel 234 therebetween. The inlet edge 226 has an inner diameter somewhat larger than the inner diameter 210 of the ring 202. Accordingly, the inner ends of the curvilinear vanes are in close proximity to the motor housing's sidewall 84. Indeed, the vanes 232 extend in such a manner that their inner ends are exposed between the space formed between the motor housing sidewall and the inlet edge 226. As best seen in FIG. 13, the shroud plate 220 is substantially aligned with the motor housing end wall 86. In this particular embodiment, a plurality of posts 240 extend from the flywheel side at 224. Each post 240 has a tapered end and a bushing 242 that supports the post 240 with respect to the flywheel side 224. When the flywheel is assembled to the motor shaft 90 it will be appreciated that the posts 240 are received in corresponding flywheel post receptacles 250 provided in the motor side 44 of the flywheel. To assist in the assembly of the fan assembly 200 the flywheel 100" the shroud plate 220 may have a plurality of orientation holes 244. The flywheel motor side 106 may have corresponding orientation tabs 245 that are received in the holes 244. Insertion of the tabs 245 into the holes 244 help in aligning the fan with the flywheel. This is even more helpful if threaded fasteners are used to secure the two pieces to one another instead of the posts. It will further be appreciated that the shrouded fan assembly could be secured directly to the shaft. In other words, if the motor assembly is used for purposes other than rotating a flywheel, then the shrouded fan assembly can still be used to generate a cooling air flow through the motor assembly. In order to accomplish this a connecting plate would need be attached between the shaft and the shrouded fan plate.

In operation, as the shaft and flywheel assembly rotate, the radial fan assembly 200 rotates in a like manner and air is drawn through the motor housing and out the openings 92. This air is then directed between the housing sidewall and the inlet edge 226 and gathered by the curvilinear vanes 232. The air flow is then directed through the channels 234 and directed into the deflection face 230 in such a manner that the air flow is directed back toward the other end of the motor housing along the surface of the motor housing wall 84. A seal 252 may be interposed between the sidewall 84 and the inner diameter 210 of the ring 202. As in previous embodiments, this seal eliminates parasitic air flow that would otherwise interfere with the air flow from the interior of the motor housing through the radial fan assembly.

Figure 14:
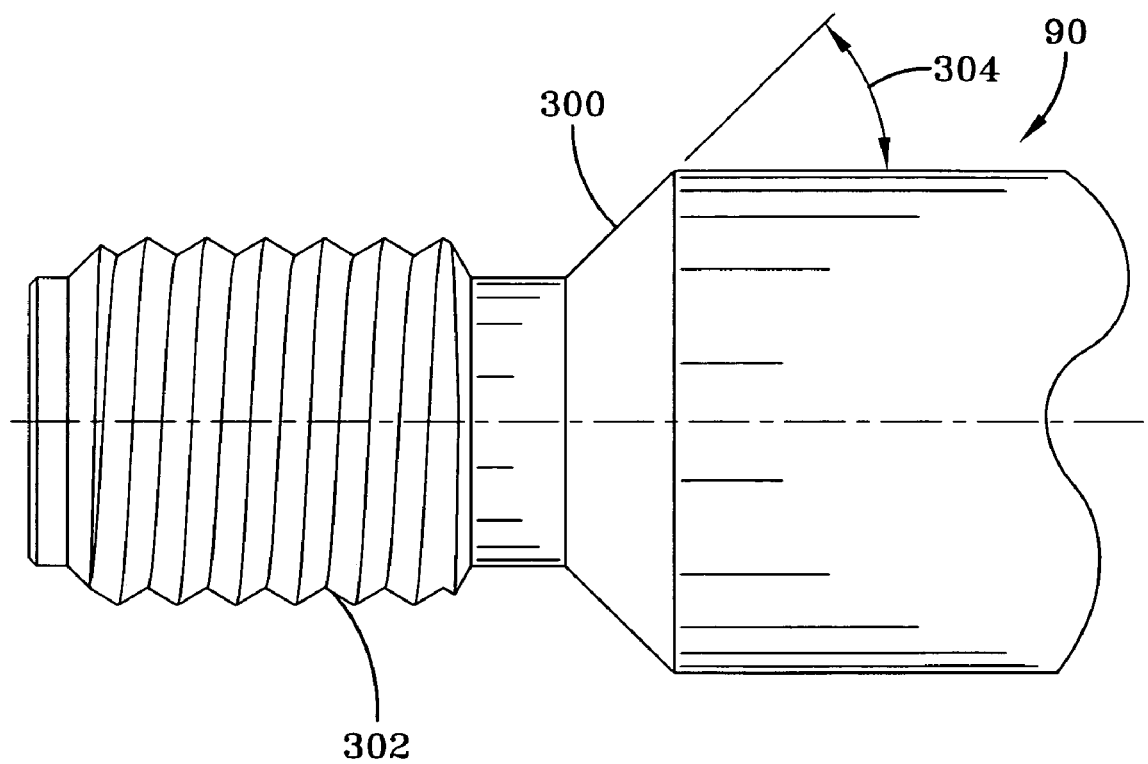
FIG. 14 is a partial elevational view of a motor shaft utilized by all four embodiments of the present invention.
Figure 15:
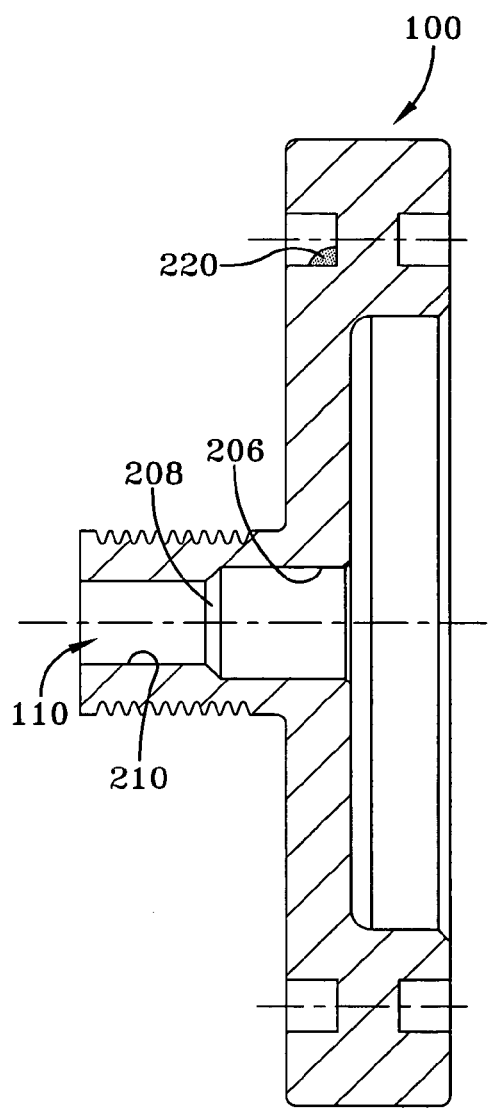
FIG. 15 is a cross-sectional view of an exemplary flywheel illustrating the inventive feature of a shaft aperture.
Figure 16:
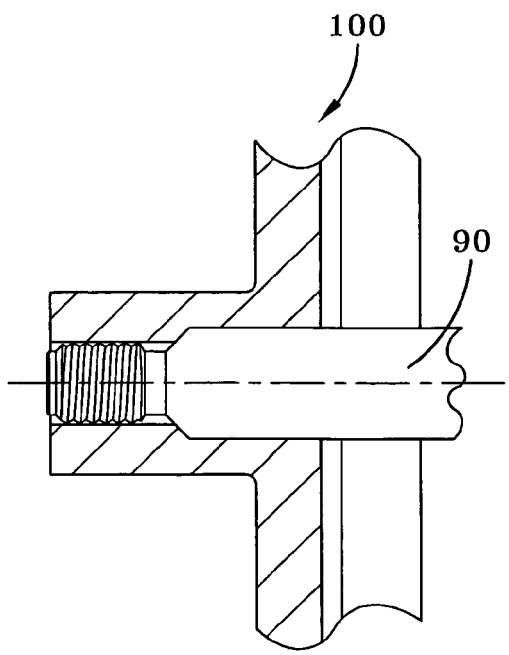
FIG. 16 is a partial cross-sectional view of the rotatable motor shaft secured to the exemplary flywheel.
Figure 17:
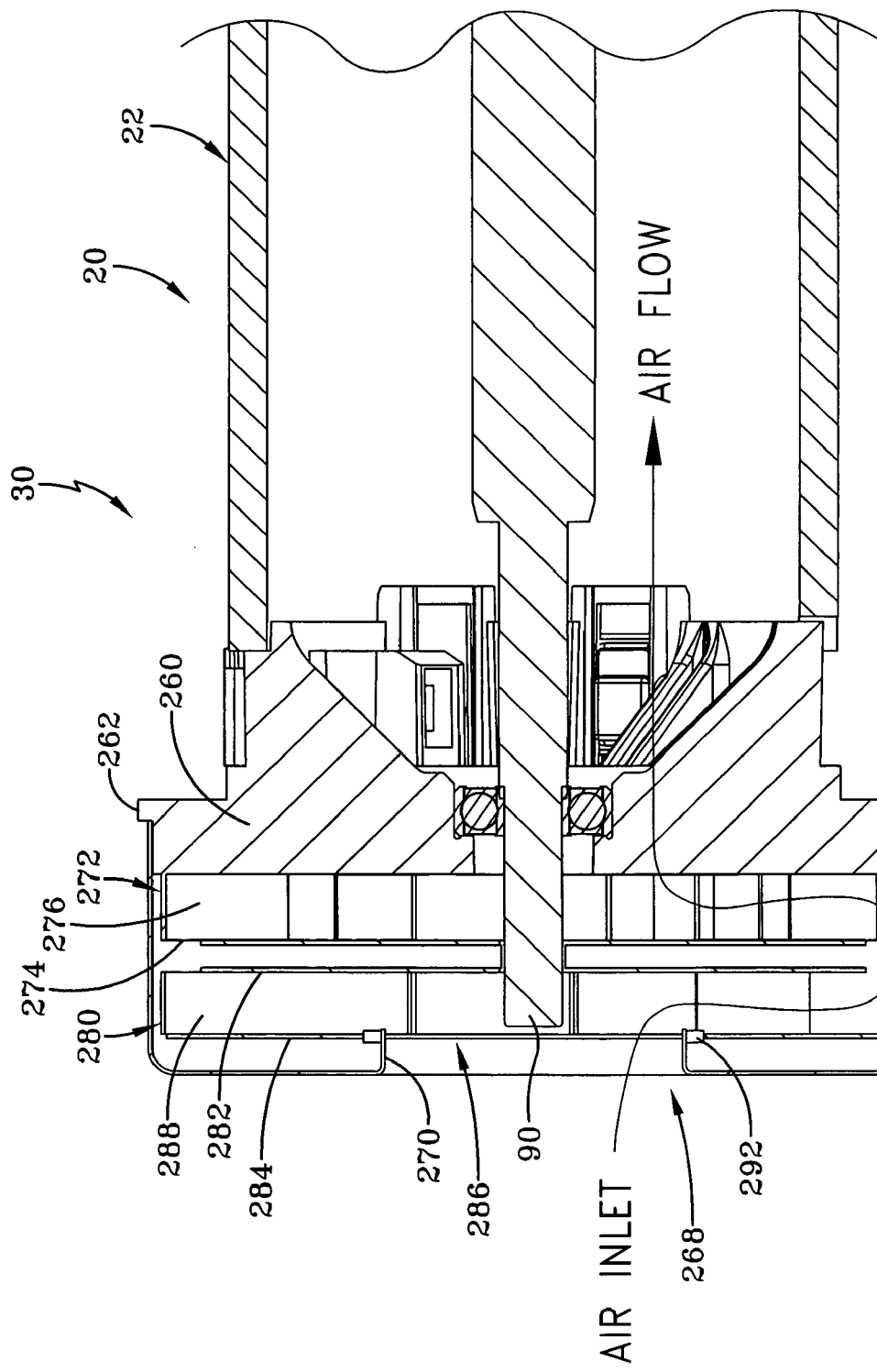
FIG. 17 is a partial cross-sectional view of a ventilation fan system at an end of the motor housing opposite the flywheel, wherein the ventilation fan system may be used with all four embodiments of the flywheel/motor assembly.

Referring now to FIGS. 14–16, it will be appreciated that another feature of the flywheel/motor assembly according to the present invention is provided by the particular features associated with the shaft 90 and the shaft aperture 110 which receives the shaft. The shaft 90, as best seen in FIG. 14, includes a frusto-conical section 300 that extends into a threaded section 302. The frusto-conical section provides a shaft taper angle 304 which in the preferred embodiment is approximately 45 degrees plus or minus 0.25 degrees.

Referring now to FIG. 15, the flywheels 40, 100, and 100' provide a shaft aperture 110 extending therethrough. The shaft aperture 110 includes a shaft wall 306 that extends into a taper wall 308 which further extends into an internal threaded section 310. The taper wall 308 provides a seat angle 312 positioned between the shaft wall 306 and the internal threaded section 310. The seat angle 312 is approximately 43 degrees plus or minus 1 degree.

Figure 15A:
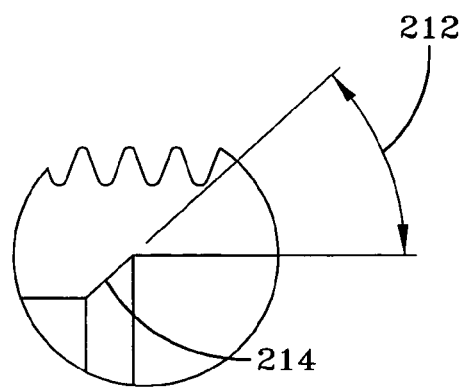
FIG. 15A is a detailed view of the shaft aperture shown in FIG. 13.

When assembling the flywheel 100 to the shaft 90, it will be appreciated that the slight mismatch between the seat angle 312 and the shaft taper angle 304 is such that as the flywheel is rotated onto the shaft and their corresponding threaded surfaces engage with one another, the flywheel is properly aligned with the shaft and as such an imbalance condition is significantly reduced. Moreover, an adhesive 314 may be disposed between the seat angle 312 and the taper angle 304 so as to further facilitate the securement of the shaft to the flywheel 100. The details of the seat angle 312 are shown in FIG. 15A and the assembled configuration in shown in FIG. 16.

Once the flywheel of the various embodiments is secured to the shaft 90, it will be appreciated that a test of the assembly is undertaken to ensure that the flywheel is in a balanced condition. Accordingly, by utilizing well known testing equipment the motor is energized and the flywheel is rotated at a representative speed. As the flywheel is rotated, a location of an out-of-balance condition can be easily determined and marked on the pulley side of the flywheel. Based upon this designation of an imbalance condition, the person monitoring the test equipment may then incorporate a slight amount of balance material 320 into a selected balancing bore 28. Once the material 320 hardens in the bore, it is quite difficult to remove and by further evaluation, it can be assured that the added material provides the desired balance to the motor/flywheel assembly.

Referring now to FIG. 17 the details of the ventilation system 30 will now be discussed. The ventilation system 30 is secured to the housing 20 at the end opposite the flywheel assembly. Although the ventilation system 30 is an optional feature, it is believed to independently enhance the air flow through the motor housing and thus, improve the overall performance of the motor and attached equipment.

An end bracket 260, which supports a carbon brush assembly, bearings and other motor components in a known manner, is secured to the end of the motor housing 22 and rotatably receives the shaft 90. The end bracket 260 includes a radially extending rim 262.

A fan shell, designated generally by the numeral 264 is mounted to the end bracket 260 and engages the rim 262. The fan shell 264 includes a wall 266 that is frictionally received upon the end bracket 260 or the shell may be secured to the bracket in other ways known in the art. The fan shell 264 has a shell opening 268 extending therethrough. The opening 268 is formed by a shell flange 270.

Received within the fan shell 264 is a stationary fan 272. The stationary fan 272 includes a stationary plate 274 which has a hole therethrough for allowing rotatable movement of the shaft 90. Interposed between the stationary plate 274 and the end bracket 260 are a plurality of stationary vanes 276.

A rotating fan 280 is also received within the fan shell 264. The rotating fan 280 is secured to the end of the rotating shaft and is configured to be in a substantially parallel relationship to the stationary fan 272. The rotating fan 280 includes a fan disc 282 which is adjacent the stationary fan and secured to the shaft 90 by a fastener. The rotating fan 280 also includes a fan ring 284 which has an eyelet 286 substantially therethrough that is aligned with the shell opening 268. A plurality of curvilinear vanes 288 extend between the fan disc 282 and the fan ring 284. The vanes 288 form channels 290 therebetween. It will be appreciated that the fan ring 284 is positioned in close proximity to the end of the fan shell such that a fan seal 292 may be disposed between the shell flange 270 and the inner diameter of the fan ring 284. This ensures that all air entering the shroud is efficiently received by the rotating fan 280.

In operation, as the shaft 90 is rotated by the motor assembly contained within the motor housing, air is drawn in through the shell opening 268 and into the fan ring 284. The air is collected between the vanes 288 and expelled out the channels 290 into the inner surface of the fan shell 264. This air is expelled through the fan shell and into the outer periphery of the stationary fan 272. The air is then moved through the stationary vanes 276 and through openings provided by the end bracket 260. This cooling air then travels within the motor housing cooling the motor windings provided by the rotor and stator assemblies so as to facilitate the heat transfer from within the motor assembly outwardly so as to improve the performance characteristics of the motor assembly.

It will be appreciated that use of the ventilation system 30 with any one of the embodiments utilizing the flywheel assembly is advantageous and that air flow is further enhanced. This allows the motor assembly to run at higher operating currents which improves the horsepower performance of the motor assembly.

Based upon the foregoing, the advantages of the present invention are readily apparent. In particular, the variations of the flywheel/fan motor assembly provide improved air flow characteristics such that the air flow properties through the motor cool the rotor and stator to such a degree that additional horsepower can be generated by the motor assembly. The shrouded centrifugal cooling fan configuration with the radial exhaust features abates the noise generated by the cooling fan. Yet another advantage of the present invention is that the shrouded configuration in the first and third embodiments turns the radial exhaust component of the fan discharge in an axial direction. This further lowers the noise level and improves sound quality. Moreover, it will be appreciated that the fan may be manufactured from a polymeric molded material that mounts to the flywheel and as such the radial exhaust shroud may slip over the fan's outer diameter and be snapped into place. Yet another advantage of the present invention is that the fan eye seal is a low friction material that is adhered to either the motor housing or the flywheel and is in contact with the opposing surface. This seal prohibits the fan from pulling air through the gap between the fans inner diameter and the outer diameter of the housing. Accordingly, the pressure differential across the motor components is increased and, thus, increases the cooling fan efficiency. This increase in efficiency allows the motor to be rated at a higher horsepower and operate at a lower temperature at a given load point.

Thus, it can be seen that the objects of the invention have been satisfied by the structure and presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A flywheel/motor assembly comprising:
   a motor housing having a sidewall and an end wall extending substantially perpendicularly from said sidewall, said motor having a rotatable shaft extending from said end wall, and said motor housing having at least one air flow opening therethrough;

a flywheel coupled to said shaft, said flywheel comprising a plate having a shaft aperture therethrough and a rim positioned proximate to the radially outer edge of said plate and projecting towards said motor housing, said plate defines a pulley side and said rim terminates at a motor side opposite said pulley side, said rim includes an inner rim wall extending from said plate to said motor side, wherein said motor side is aligned with said end wall and does not extend past said sidewall;

a plurality of vanes associated with said flywheel, wherein adjacent vanes form channels therebetween; and a ring coupled to said plurality of vanes, said ring at least partially enclosing said channels and forming exhaust ports away from said shaft, wherein rotation of said flywheel draws air through said motor housing into said channels and out said exhaust ports.

2. The assembly according to claim 1, wherein said plurality of vanes extend between said plate and said inner rim wall, said ring spaced apart from said inner rim wall.

3. The assembly according to claim 2, wherein said inner rim wall is provided at an angle other than a right angle with respect to said plate.

4. The assembly according to claim 3, wherein said ring comprises:
a ring pulley side;
a ring motor side opposite said ring pulley side, said ring having an eyelet therethrough forming an inner diameter; and
a peripheral lip connecting said ring pulley side to said ring motor side, wherein said peripheral lip is directed toward said motor housing.

5. The assembly according to claim 4, wherein each of said vanes has an aperture edge, and wherein said aperture edges are substantially aligned with said inner diameter.

6. The assembly according to claim 1, wherein said ring comprises:
a ring motor side;
a ring rim side opposite said ring motor side, said ring having an eyelet therethrough forming an inner diameter; and
an outer edge connecting said ring motor side to said ring rim side, wherein said inner diameter is slightly larger than said motor housing sidewall's diameter.

7. The assembly according to claim 6, wherein said plurality of vanes extend from said ring rim side.

8. The assembly according to claim 7, wherein said outer edge has substantially the same diameter as said rim.

9. The assembly according to claim 7, wherein said plurality vanes are curvilinear and wherein some of said vanes have a fastener aperture therethrough for receiving a fastener that secures said ring to said motor side.

10. The assembly according to claim 9, wherein said motor housing sidewall has a sidewall opening therethrough, and wherein said channels are in juxtaposition to said sidewall openings.

11. The assembly according to claim 7, wherein said outer edge has a diameter less than said rim.

12. The assembly according to claim 11, further comprising:
a rim chamfer extending between said motor side and said inner rim wall.

13. The assembly according to claim 12, further comprising:
a vane wing extending from each of said plurality of vanes, said vane wing conforming to said inner rim wall.

14. The assembly according to claim 11, further comprising:
a shroud secured between said ring and said motor side, said shroud having a deflection face juxtaposed to said plurality of vanes to axially re-direct the air generated by rotation of said flywheel over said motor housing.

15. The assembly according to claim 14, further comprising:
a vane wing extending from each of said plurality of vanes, said vane wing conforming to said inner rim wall.

16. The assembly according to claim 1, wherein said motor side is substantially parallel with said end wall and spaced apart therefrom.

17. The assembly according to claim 16, further comprising:
a seal secured to one of said ring and said motor housing and in bearing contact with the other of said ring and said motor housing.

18. The assembly according to claim 17, wherein said seal is made from expanded polytetrafluoroethelene.

19. The assembly according to claim 17, wherein said seal precludes the entry of parasitic air between said ring and said motor housing and into said channels.

20. The assembly according to claim 16, wherein said flywheel has a plurality of balancing bores therein, and wherein balancing material is receivable therein.

21. The assembly according to claim 20, wherein said plurality of balancing bores are radially and equidistantly spaced about said pulley side.

22. The assembly according to claim 21, further comprising adhesive disposed between said shaft taper angle and said seat angle.

23. The assembly according to claim 2, wherein said rotatable shaft includes a shaft taper angle, and wherein said flywheel has a shaft aperture for receiving said rotatable shaft, said shaft aperture having a seat angle that engages said shaft taper angle, said shaft taper angle is slightly larger than said seat angle.

24. The assembly according to claim 1, further comprising:
a ventilation system coupled to said motor housing at an end opposite said flywheel.

25. The assembly according to claim 24, wherein said ventilation system comprises:
a fan shell having a shell opening therethrough, said fan shell coupled to said motor housing;
a rotating fan secured to said rotatable shaft, said rotating fan drawing air through said shell opening and into said motor housing.

26. The assembly according to claim 25, wherein said ventilation system further comprises:
a stationary fan interposed between said rotating fan and said motor housing, wherein said stationary fan re-directs air flow generated by said rotating fan into said motor housing.

27. The assembly according to claim 26, wherein said rotating fan comprises:
a fan disc;
a fan ring having an eyelet therethrough, said eyelet substantially aligned with said shell opening; and
a plurality of rotating fan vanes connecting said fan disc to said fan ring.

28. The assembly according to claim 27, wherein said ventilation system further comprises:
   a ventilation fan seal disposed between said fan shell and said rotating fan at said shell opening and said eyelet.

29. The assembly according to claim 1 further comprising a ventilation system, wherein said flywheel is coupled to one end of said shaft and said ventilation system is coupled to an opposite end of said shaft, wherein said ventilation system generates an air flow through said flow through openings toward said flywheel.

30. The assembly according to claim 29, wherein said ventilation system comprises:
   a fan shell having a shell opening therethrough, said fan shell coupled to said motor housing;
   a rotating fan secured to said rotatable shaft, said rotating fan drawing air through said shell opening and into said motor housing.

31. The assembly according to claim 30, wherein said ventilation system further comprises:
   a stationary fan interposed between said rotating fan and said motor housing, wherein said stationary fan re-directs air flow generated by said rotating fan into said motor housing.

32. The assembly according to claim 31, wherein said rotating fan comprises:
   a fan disc;
   a fan ring having an eyelet therethrough, said eyelet substantially aligned with said shell opening; and
   a plurality of rotating fan vanes connecting said fan disc to said fan ring.

33. The assembly according to claim 32, wherein said ventilation system further comprises:
   a ventilation fan seal disposed between said fan shell and said rotating fan at said shell opening and said eyelet.

34. A flywheel/motor assembly comprising:
   a motor housing having a sidewall and an end wall extending substantially perpendicularly from said sidewall, said motor having a rotatable shaft extending from said end wall, and said motor housing having at least one air flow opening therethrough;
   a flywheel coupled to said shaft, said flywheel comprising a pulley side and a motor side opposite said pulley side, wherein said motor side is aligned with said end wall and does not extend past said sidewall;
   a plurality of vanes associated with said flywheel, wherein adjacent vanes form channels therebetween;
   a ring coupled to said plurality of vanes, said ring at least partially enclosing said channels and forming exhaust ports away from said shaft, wherein rotation of said flywheel draws air through said motor housing into said channels and out said exhaust ports; and
   wherein said vanes are curvilinear and some of said vanes have a fastener aperture therethrough for receiving a fastener that secures said ring to said flywheel motor side.

35. A flywheel/motor assembly comprising:
   a motor housing having a sidewall and an end wall extending substantially perpendicularly from said sidewall, said motor having a rotatable shaft extending from said end wall, and said motor housing having at least one air flow opening therethrough;
   a flywheel coupled to said shaft, said flywheel comprising a pulley side and a motor side opposite said pulley side, wherein said motor side is aligned with said end wall and does not extend past said sidewall;
   a plurality of vanes associated with said flywheel, wherein adjacent vanes form channels therebetween;
   a ring coupled to said plurality of vanes, said ring at least partially enclosing said channels and forming exhaust ports away from said shaft, wherein rotation of said flywheel draws air through said motor housing into said channels and out said exhaust ports; and
   a shroud secured between said ring and said motor side, said shroud having a deflection face juxtaposed to said plurality of vanes to axially re-direct the air generated by rotation of said flywheel over said motor housing.

36. A flywheel/motor assembly comprising:
   a motor housing having a sidewall and an end wall extending substantially perpendicularly from said sidewall, said motor having a rotatable shaft extending from said end wall, and said motor housing having at least one air flow opening therethrough;
   a flywheel coupled to said shaft, said flywheel comprising a pulley side and a motor side opposite said pulley side, wherein said motor side is aligned with said end wall and does not extend past said sidewall, said motor side is substantially parallel with said end wall and spaced apart therefrom;
   a plurality of vanes associated with said flywheel, wherein adjacent vanes form channels therebetween;
   a ring coupled to said plurality of vanes, said ring at least partially enclosing said channels and forming exhaust ports away from said shaft, wherein rotation of said flywheel draws air through said motor housing into said channels and out said exhaust ports; and
   a seal secured to one of said ring and said motor housing and in bearing contact with the other of said ring and said motor housing.

\* \* \* \* \*

UNITED STATES PATENT AND TRADEMARK OFFICE
CERTIFICATE OF CORRECTION

PATENT NO. : 7,091,635 B1 Page 1 of 1
APPLICATION NO. : 10/970802
DATED : August 15, 2006
INVENTOR(S) : Gilliland, Finkenbinder and Coles It is certified that error appears in the above-identified patent and that said Letters Patent is hereby corrected as shown below:

In Column 12, line 34 (Claim 22, line 1) -- the claim should depend from claim 23, not claim 21 as printed; and
In Column 12, line 37 (Claim 23, line 2) -- the claim should depend from claim 16, not claim 2 as printed.

Signed and Sealed this

Fifth Day of August, 2008

JON W. DUDAS
*Director of the United States Patent and Trademark Office*